July 5, 1966      A. WALKER      3,259,381

THERMOCOUPLE PICKUP FOR A HEATING CHAMBER

Filed Oct. 29, 1962      6 Sheets-Sheet 1

INVENTOR.
ARTHUR WALKER
BY Whittemore, Hulbert
& Belknap
ATTORNEYS

July 5, 1966   A. WALKER   3,259,381
THERMOCOUPLE PICKUP FOR A HEATING CHAMBER
Filed Oct. 29, 1962   6 Sheets-Sheet 2

INVENTOR.
ARTHUR WALKER
BY Whittemore, Hulbert
& Belknap
ATTORNEYS

United States Patent Office 3,259,381
Patented July 5, 1966

3,259,381
THERMOCOUPLE PICKUP FOR A HEATING CHAMBER
Arthur Walker, Livonia, Mich., assignor to Holcroft & Company, Detroit, Mich., a corporation of Michigan
Filed Oct. 29, 1962, Ser. No. 233,545
7 Claims. (Cl. 263—6)

This invention relates to a heat processing unit of the indirect type utilizing a controlled inert protective gas atmosphere and relates more particularly to a thermoelectric pyrometer for a radiant tube fired annealing furnace which is particularly adaptable for treating materials such as aluminum coils.

This invention is characterized by the provision of a heat processing unit having one or more sealed chambers through which a car or carrier is moved. A thermocouple is located in or on the material on the carrier, as an example, aluminum coils, and is electrically connected to a pair of contact points provided on the carrier. A pair of movable contact probes which is electrically connected to an instrument located exteriorly of the processing unit is adapted to be moved through a wall of the processing unit into contact with the contact points provided on the carrier to complete an electrical circuit between the thermocouple and the instrument. The instrument is designed to connect the output of the thermocouple into a signal required for temperature indication or control.

In the past, the thermocouple embedded in the coils has been connected directly to the instrument by relatively long lead wires. Such an arrangement has proven unsatisfactory, particularly when you consider that the processing unit may have a relatively long length which required that the openings for the wires be sealed at each step of progression. In addition, it was difficult at times to protect the lead wires and to maintain a closed or sealed unit.

It is an object of the present invention to provide a heat processing unit utilizing a controlled inert protective gas atmosphere wherein means are provided for making an electrical connection between one or more thermocouples located in or on material or materials which are located on a movable car, carrier, or platform in a sealed chamber, and any instrument which is adapted to convert the output of the thermocouple into a signal which is required for temperature indication or control, said instrument being located outside of the sealed chamber.

Another object of the present invention is to provide an apparatus for measuring temperature in or on a given object as it is progressively moved from one sealed chamber to another in an industrial furnace without having trailing wires which must be followed and opening sealed at each step of progression.

Still another object of the present invention is to provide a heat processing unit comprising one or more substantially sealed chambers, a carrier which is adapted to be moved lengthwise through the chambers, said carrier having material to be treated thereon, a thermocouple in contact with the material, a pair of electrical contact points on the carrier, lead wires connecting the thermocouple to the contact points, an instrument for measuring the output of the thermocouple, said instrument being located exteriorly of the furnace, a pair of contact probes for each of the chambers, said probes being movably mounted in a wall of the chamber, lead wires connecting the contact probes to the instrument, and means for moving a pair of the contact probes into contact with the aforesaid contact points on the carrier to complete an electrical circuit between the thermocouple and the instrument.

A further object of the present invention is to provide a heat processing unit of the aforementioned type wherein the instrument includes means for calibrating the output of the thermocouple in terms of the temperature of the material.

A still further object of the present invention is to provide a heat processing unit of the aforementioned type wherein means are provided for controlling the temperature of the material in response to the signal of the instrument.

Still another object of the present invention is to provide a heat processing unit of the aforementioned type wherein the means for moving the contact probes includes an arm operatively connected to the ends of the contact probes located exteriorly of the furnace, said arm being adapted to move the contact probes in unison toward and away from the contact points to respectively make and break the aforesaid electrical circuit.

A further object of the present invention is to provide a heat processing unit of the aforementioned type wherein operated means is operatively connected to the arm for moving the arm and contact probes.

A still further object of the present invention is to provide a novel thermoelectric pyrometer which does not require relatively long lead wires and which is particularly adapted for a closed and sealed heat processing unit.

It is thus another object of this invention to provide a simplified low cost structure of the aforementioned type having certain advantages contributing to efficiency, reliability, and long life, as well as ease of maintenance.

Further objects and advantages of the present invention will be apparent from the following description, reference being had to the accompanying drawings wherein a preferred form of the present invention is clearly shown.

FIGURES 8 and 9 represent the safety control electrical diagram and circuit for the heat processing unit.

The present invention is particularly adapted for an annealing furnace or heat processing unit of the type illustrated and described in my co-pending application U.S. Ser. No. 175,777, which was filed on February 26, 1962, now Patent No. 3,182,981, granted May 11, 1965.

Briefly described, the furnace comprises a heating chamber and a cooling chamber. The heating chamber is heated by U-shaped radiant tubes mounted vertically therein. The cooling chamber is connected to the exit end of the heating chamber and is separated therefrom by a transversely movable door having a plurality of openings therein. High volume circulating fans are mounted in the heating and cooling chambers for circulating and controlling the flow of the inert protective gas atmosphere from a gas converter. An auxiliary cooling chamber may be provided at the exit end of the regular cooling chamber and is provided with circulating fans mounted in the side walls thereof for cooling the work therein.

Figure 1:
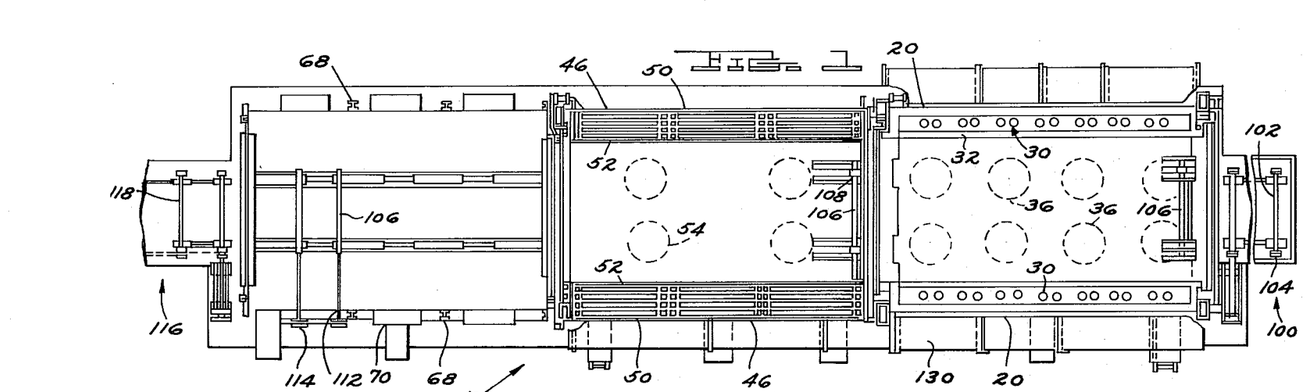
FIGURE 1 is a top view of a heat processing unit.

Referring now more specifically to FIGURE 1, the annealing furnace or heat processing unit is designated by the numeral 10 and includes a portion which is mounted below the level of the floor. The annealing furnace 10 comprises a plurality of sections, namely the heating section 14 and the cooling chamber 16. An optional or auxiliary air-cooling chamber 18 may be provided at the exit end of the cooling chamber 16.

The top and side walls 20 of the heating chamber 14 are formed from a high heat resistant refractory material such as insulating fire brick, monoblock insulation, or other suitable material. The exterior side of the walls 20 is provided with the usual structural steel frame 22 which consists of appropriate steel sheets, channels, angles, I-beams, or the like. A concrete slab 24 defines the bottom wall of the heating chamber 14 and is generally located in a floor pit.

Heating chamber 14 has a series of vertically mounted, gas fired, U-shaped tubes 30 adjacent each of the side walls 20. Tubes 30 are of high temperature alloy and are equipped with radiant tube burners which are specifically designated for position type proportioning control to provide a constant supply of heat with no peaks of high fire or dead periods of low fire. This provides the uniformity of firing which is of utmost importance in heating coils such as aluminum.

Figure 2:
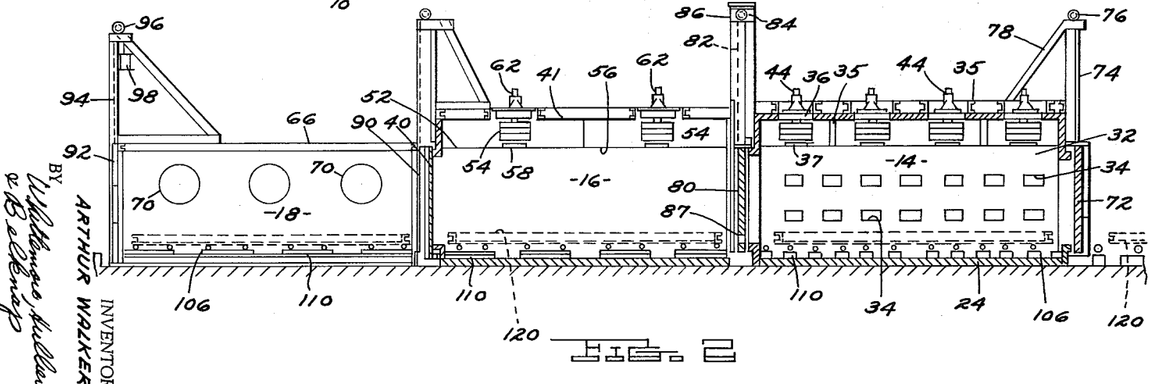
FIGURE 2 is a longitudinal cross-sectional view of the heat processing unit.

On the inner sides of the radiant tubes 30 are provided a pair of longitudinally extending radiation baffles 32 which are adapted to radiate heat from the U-shaped tubes 30. The radiation baffles 32 which are usually made from stainless steel are each provided with a plurality of openings 34 which permit circulation of the atmosphere therethrough. The openings 34 are arranged in two longitudinally extending rows as best shown in FIGURE 2. The radiation baffles 32 are supported by the top wall of the heating chamber 14 by means of a plurality of hangers 35. The U-shaped tube burners per se, which form no part of the present invention, are identical in construction and a description of one will suffice for all. Gas and air are introduced separately into the tube 30 and are progressively mixed by a controlled diffusion after they have passed through the tube 30, thus providing an ideal luminous flame. The heating medium may be gas, oil, or electricity. The tubes 30 are heated by the flame and in turn radiate their heat to the surrounding furnace wall and radiation baffle 32.

A plurality of high volume circulating fans 36 are divided in two rows and extend lengthwise of the heating chamber 14 as illustrated in FIGURE 1. The fans 36 provide the high volume and velocity which is essential for circulating the protective gas atmosphere throughout the chamber 14. The atmosphere is directed into the chamber 14 from a gas converter, not shown. The fans 36 are of the squirrel cage impeller type which can develop greater pressure than the conventional propeller type fans. As a result, the fans 36 create a positive circulation by pulling in the gas atmosphere through the intakes 37 of the fans 36 and circulating the gas atmosphere in a downward direction over the heating tubes 30 and upwards around the material to be treated as described in my copending application.

Protective fan shrouds made from suitable metal are supported in the heating chamber 14 and help in directing the protective gas atmosphere throughout its circular paths. Electrically driven motors, not shown, are carried by appropriate structural members on top of the heating chamber 14. The motors are appropriately connected to the shafts 44 of fans 36 for rotating the fans at a predetermined speed.

The cooling chamber 16 is provided with side walls 46 of suitable refractory material. The exterior side of the walls 46 and the top wall, which may be made from metal or appropriate refractory material, is provided with structural framing members which may take the form of structural channels, angles, I-beams, or the like. Adjacent the side walls 46 are a series of horizontal, finned water cooled coils 50. Banks of water cooled coils 50 are arranged adjacent each side wall 46 and are enclosed by a protective shroud 52 which extends lengthwise of the chamber 16. The shroud 52 forms a wall which aids in directing the protective gas atmosphere around the cooling coils 50. The cooling coils 50 remove the heat from the atmosphere which circulates throughout the heated work in the cooling chamber 16. Two pairs of high volume fans 54 are mounted in the top wall of the chamber 16. Metal shrouds 56 enclose the fans 54 leaving only the intakes 58 of the fans 54 open to the interior of the chamber 16. Electrically driven motors, not shown, are appropriately connected to the shafts 62 of the fans 54. The fans 54 are of the squirrel cage impeller type and create a positive circulation of the heated gas protective atmosphere downward over the cooling coils 50 and then upward around the material as described in my copending application.

At the exit end of the cooling chamber 16 may be provided an auxiliary or optional cooling chamber 18. The chamber 18 is provided with a suitable metal casing 66 which is supported by appropriate structural framing member 68. A plurality of fans 70 are mounted in the side walls of the chamber 18 for pulling air from the exterior of the chamber 18 and circulating the air around the heated work in the interior thereof. Generally the cooling chamber 16 cools the work to approximately 300° F. The auxiliary chamber 18 further reduces the temperature of the work or it may be used for cooling work brought from a different area.

At the entrance to the heating chamber 14 is provided a transversely movable door 72 which is supported by a cable 74 carried over a pulley 76 supported by the supporting member 78. Means are provided for rotating the pulley 76 so as to raise or lower the door 72. A transversely movable door 80 is provided between the heating chamber 14 and the cooling chamber 16. The door 80 is carried by a cable 82 which is suspended on a pulley 84. The pulley 84 is carried by an appropriate structural member 86. A plurality of openings 87 are provided in the door 80 to provide communication between the heating chamber 14 and the cooling chamber 16. A door 90 is provided at the exit end of the cooling chamber 16 and is suspended in the same manner as the door 72. In addition, the auxiliary cooling chamber 18 is provided with a door 92 at the exit end thereof which has a cable 94 attached thereto which surrounds a pulley 96. The pulley 96 is balanced by a suitable counterweight 98. The doors 72, 80, 90, and 92 are raised and lowered by the main furnace roll drive through a clutch system as set forth in my copending application.

At the entrance end of the heating chamber 14 is provided a loading section 100 which includes a plurality of power driven rollers 102 which are supported by suitable bearings 104 a predetermined distance above the ground. A plurality of longitudinally spaced, transversely extending rollers 106 which are mounted in all of the chambers 14, 16, and 18 are supported by appropriate bearings 108 carried by rows of longitudinally aligned rails 110. The rollers 106 are in turn connected by appropriate shaft extensions 112 which extend through side walls of the chambers 14, 16, and 18 and are provided at the outer ends thereof with sprockets 114. The sprockets 114 are in turn connected to a suitable chain drive mechanism, not shown, which rotates the extensions 112 and rollers 106 as required. The unloading section 116 is provided with power driven rollers 118 which are mounted and similar to rollers 102.

Figures 3, 7:
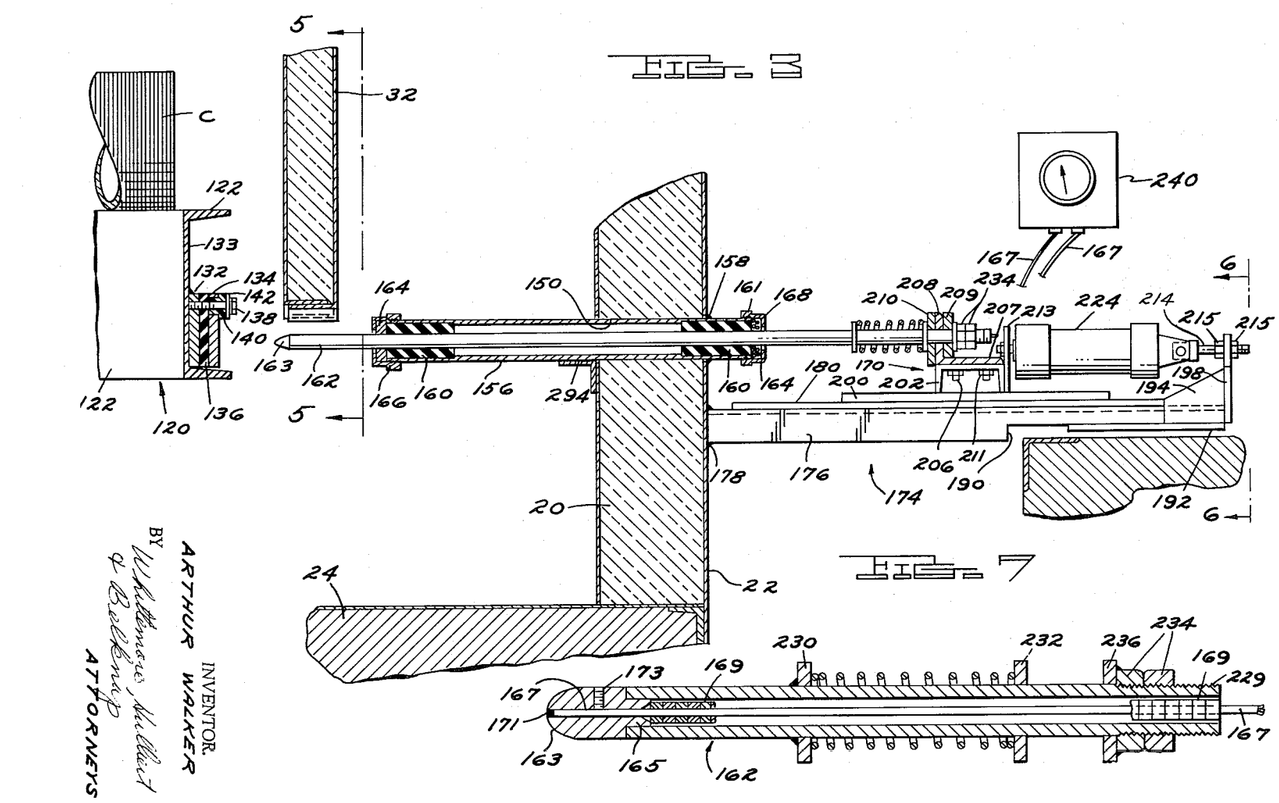
FIGURE 3 is a vertical sectional view taken substantially on the line 3—3 of FIGURE 4.
FIGURE 7 is a longitudinal sectional view through one of the contact bars.
Figure 4:
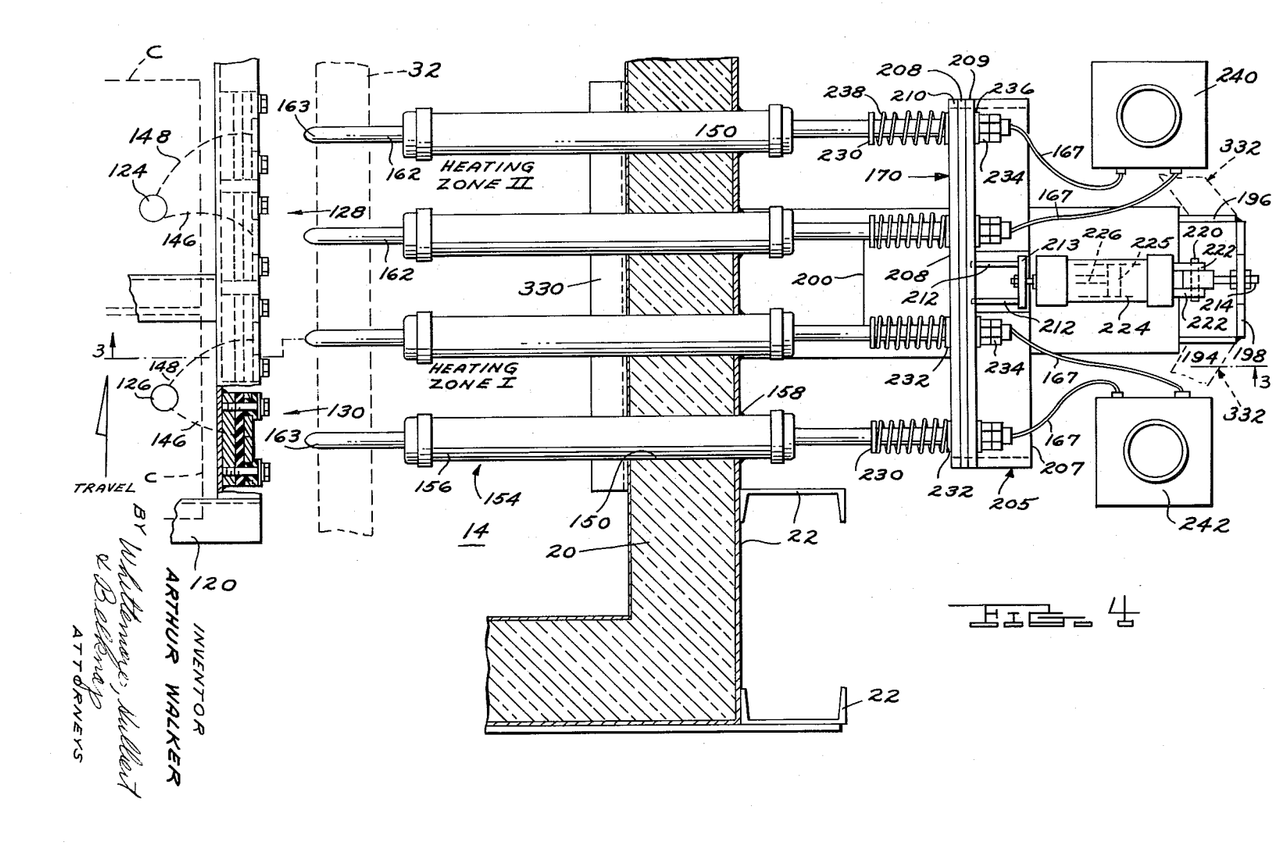
FIGURE 4 is a partial view of the heat processing unit and illustrating in particular the thermoelectric pyrometer.

The material such as aluminum coils C are carried by an appropriate structural steel work rack 120 which is best illustrated in FIGURES 3 and 4. The work rack 120 has various openings therein which permit the gas atmosphere to be circulated upwards therethrough into and around the aluminum coils C.

An appropriate walkway 130 is provided on the upper parts of the chambers 14 and 16 so as to permit a workman to reach the fans and the associated electrically driven motors for maintenance purposes.

As previously mentioned, the door 80 is provided with a plurality of openings 87. When the cooling chamber 16 is purged the gas atmosphere is introduced into the heating chamber 14 from a gas converter which causes the gas to flow through the holes 87 in the door 80 into the cooling chamber 16 and thereby prevent infiltration of air into the heating chamber 14.

When the heating chamber 14 is purged the gas atmosphere is introduced into the cooling chamber 16 and flows into the heating chamber 14 through the openings 87 provided in the door 80. This is the normal gas flow. In addition, the gas atmosphere is preheated by the stock in the cooling chamber 16 before it flows into the heating chamber 14. This method of purging is made possible by the provision of separate heating and cooling chambers.

The controlled atmosphere introduced into the furnace 10, to protect the aluminum coils from oxidizing during annealing, is prepared by an exothermic gas converter or generator. The gas generator is of the type well known in the art and utilizes an air-gas mixture which is burned in a reaction chamber after which the products of combustion are cooled and the excess water vapor removed. In such a reaction, natural gas may be used as the hydrocarbon.

In operation, when the heating chamber 14 is at the requisite temperature and gas pressure, the aluminum coils are introduced therein. The specific installation as described will process loads of 80,000 pounds with approximately twelve hours in the heating chamber. During this time the atmosphere is introduced into the chamber 16 so as to prevent air from entering therein. With the fans 36 circulating at the rated capacity, the gas atmosphere is circulated around the radiant tubes 30 in circular paths. With this method, a closed system is maintained without air being pulled in or blown out the ends of the heating chamber. The heated atmosphere envelops the aluminum coils C in process and thereby closely controls the surface appearance as well as the chemical and physical properties of the coils C.

After the work has been finished in the heating chamber 14, the power driven rollers are energized so as to move the aluminum coils into the cooling chamber 16 which is at the requisite temperature and pressure. The aluminum coils C are maintained in the cooling chamber for approximately 12 hours where the controlled atmosphere which is cooled by the cooling coils 50 is effective to reduce the temperature of the aluminum coils to approximately 300° F. While the aluminum coils C are being cooled in the cooling chamber 16, another load of aluminum coils may be introduced into the heating chamber 14. With such construction, the heating chamber 14 and the cooling chamber 16 may be utilized simultaneously to perform their required function.

After the temperature of the aluminum coils C has been reduced to approximately 300°, generally after 12 hours, the coils may be moved into the auxiliary cooling chamber 18. The fans 70 pull the air in from outside of the furnace and circulate it around the aluminum coils C. The auxiliary chambers 18 may also be utilized to cool additional work brought from a different area. With the arrangement of the chambers in the manner described continuous atmosphere annealing is accomplished in a continuous processing unit.

As previously mentioned, one main furnace roll drive which is reversible is provided. The main furnace roll drive 130 is adapted to operate, in timed sequence through a system of clutches, the various doors and rollers of the entire annealing furnace as is described in my co-pending application.

The present invention specifically relates to the electrical apparatus which is adapted to provide temperature indication and control without the necessity of having relatively long lead wires which are moved through the unit as the carrier is moved through the various chambers of the heat processing unit.

The carrier 120 is made from structural steel channels 122 and is appropriately mounted for lengthwise movement through the chambers of the furnace 10 on the rollers 106. The aluminum coils C are appropriately stacked on the top surface of the carrier 120. Thermocouples 124 and 126 are embedded in the coils C as best illustrated in FIGURE 4.

The channel 122 opposite one of the radiation baffles 32 is provided with two pairs of thermocouple pickups or contact point assemblies 128 and 130, each pair corresponding to one of the thermocouples. With such an arrangement the temperatures of the coils C corresponding to certain zones of one of the chambers, as an example the heating chamber 14 as illustrated, may be readily determined. It should be understood, however, that only one pair of contact point assemblies is required in certain applications.

The construction of each of the contact point assemblies is identical and therefore a description of one will suffice. Each contact point assembly includes a backup plate 132 made from a suitable metal such as steel. The plate 132 is welded to the web 133 of the channel 122 as illustrated in FIGURE 3. A second plate 134 made from a suitable alloy, as an example a chromium-nickel alloy (type 304), is spaced from the plate 132 by an insulating board 136 which may be made from transite. The plates 132, 134, and board 136 are all rectangular and are held in an assembled position by means of a pair of threaded fasteners 138. The fasteners 138 extend through hollow insulating plugs 140 which are provided in openings in the plate 134. The plugs 140 may also be made from transite. Washers 142 are provided between the faces of the plugs 140 and the heads of the threaded fasteners 138. The fasteners 138 extend through the plugs 140 and through openings in the board 136 into threaded openings in the backup plate 132 to retain the plates in an assembled relationship. A single contact such as a conventional Allen set screw 144 is threadedly received in an opening provided in the plate 134. An opening 145 is drilled in the upper edge of the plate 134 for receiving an end of a lead wire.

Lead wires 146 and 148 connect the thermocouples 124 and 126 to the adjacent pairs of contact point assemblies 128 and 130 as illustrated in FIGURE 4. The ends of the lead wires 146 and 148 are received in the openings 145 after which time the set screws 144 are adjusted to contact and retain the lead wires. Prior to assembly the transite board 136 is painted with a silicone resin.

A side wall 20 and 22 of the heating chamber 14 is provided with four transversely extending openings 150. The openings 150 are located opposite from the contact point assemblies 128 and 130 as best illustrated in FIGURE 4. Each contact point assembly has an associated contact probe assembly 154 which extends through one of the openings 150.

Each contact probe assembly 154 includes a tubular element, casing or guide 156 which extends through its corresponding opening 150 and terminates inwardly a predetermined distance from the radiation baffle 32 as best illustrated in FIGURE 3. The guide 156 also includes a portion which extends outwardly from the chamber 14 beyond the furnace 10. An intermediate portion of the guide 156 is welded to the steel plate 22 as indicated by the numeral 158 to provide a gas tight seal connection. A pair of insulators 160 are provided at the opposite ends of the guide 156. The insulators 160 are tubular in form and are made from ceramic material. An elongated, hollow contact bar, part, or piece 162 extends through the guide 156 and insulators 160. The contact bar 162 is spaced from the inner surface of the guide 156 by the insulators 160. The contact bar 162 is adapted to move lengthwise with respect to the fixed tubular element or guide 154 as will be subsequently described.

A plug 164 made from transite is provided at the inner end of the guide 156 against the outer face of the corresponding insulator 160. The plug 164 is held against the insulator 160 by means of a cap 166 which is threaded to the guide 156. Asbestos rope 168 is wrapped around the contact bar 162 and held against the outer face of the other insulator 160 by means of an end cap 161 which is threaded to the outer end of the guide 156.

The caps 164 are provided with openings to permit lengthwise movement or reciprocation of the contact bar 162. The hollow contact bar 162, as best illustrated in FIGURE 7, is made from, as an example, a chromium-nickel alloy. The leading end of the hollow contact bar 162 is provided with a tip 163 of the same material as the bar 162. The tip 163 has a reduced portion 165 which is received in the interior of the bar 162 and secured thereto. A thermocouple wire 167 is received within the hollow bar 162 and is surrounded throughout most of its length by a row of single hole insulators 169. The leading end of the wire 167 extends through the tip 163 and terminates at a contact plug weld 171 which is carried by the tip 163. For each pair of contact bars, one of the wires 167, as an example, is made from Chromel, while the other wire 167 is made from Alumel [(—) magnetic]. The wire 167 is held in the contact bar 162 by means of a set screw 173. As an example, the contact bar 162 is made from 1″ O.D. x ¼″ tubing and has a length of approximately 3′4½″.

Means are provided for moving the four contact probe assemblies 154 in unison toward and away from the electrical contact point assemblies 128 and 130 to respectively make and break the electrical circuits. The movable means includes a crosshead 170 which is appropriately connected to the outer ends of the four contact bars 162.

Figure 6:
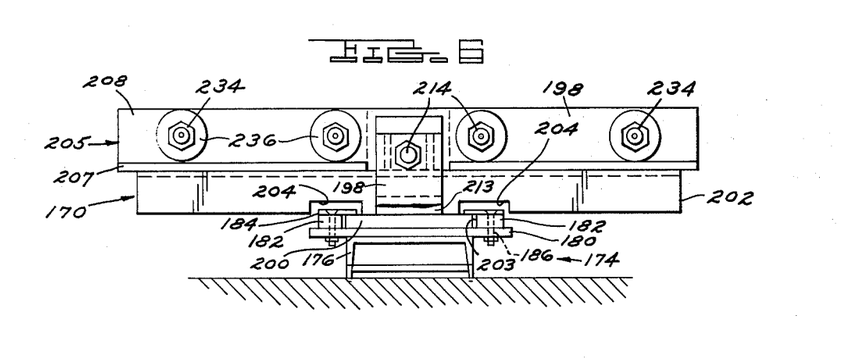
FIGURE 6 is an end view looking in the direction of arows 6—6 of FIGURE 3.

A stationary guide 174 is provided for the crosshead 170 and includes an inverted channel-shaped support 176 which has one end welded to the steel sheet 22 of the furnace wall as indicated by the numeral 178 in FIGURE 3. A plate 180 having a width greater than the width of the support 176 is mounted on top of the web of the channel-shaped support 176 and appropriately fastened thereto. The longitudinal edges of the plate 180 are provided with elongated transversely spaced guide bars 182 which are located on top of the plate 180 and extend lengthwise thereof. Retaining plates 184 are provided on top of the guide bars 182. The retaining plates 184 and guide bars 182 are secured to the plate 180 by means of longitudinally spaced threaded fasteners 186 as best illustrated in FIGURE 6.

The flange of the support 176 at the outer end thereof is notched as indicated by the numeral 190 in FIGURE 3. A plate 192 is secured to the bottom edges of the support 176. The plate 192 is provided with side plates 194 and 196 which are connected by an end plate 198.

The movable crosshead 170 includes a base 200 which has secured thereto on the top side thereof a transversely extending channel-shaped support 202. The base 200 is adapted to move through the guide channel 203 defined by the guide rails 182. The base 200 is retained in the guide channel 203 by means of the retaining plates 184 as best illustrated in FIGURE 6. The flanges of the channel-shaped support 202 are notched, as indicated by the numeral 204, so as to avoid any interference with the retaining plates 184 during movement of the crosshead 170.

An elongated holding bracket 205, made from a 4″ x 3″ x ⅜″ angle section is provided with four sets of threaded mounting studs 206 in the horizontal flange 207 of the bracket 205. The vertical flange 208 is provided with an elongated inner transite strip 209 and an outer transite strip 210. The strips 209 and 210 are appropriately secured to the vertical flange 208 by fastening means, not illustrated. The holding bracket 205 is mounted on the channel-shaped support 202 in such a manner that the four sets of studs 206 provided on the bracket 205 extend through corresponding openings provided in the support 202 and are locked in position by threaded lock nuts 211 as best illustrated in FIGURE 3.

The support 202 is provided with a pair of side plates 212 and an end plate 213, all of which are appropriately secured to the support 202. A threaded cylinder rod 214 is secured to the end plate 198 by nuts 215. The other end of the rod 214 is provided with a transversely extending pin 220 which is adapted to be received in lugs 222 carried by the cylinder 224. Mounted in the cylinder 224 is a fluid operated piston and rod assembly 225. The rod 226 of the assembly 225 is connected to the end plate 213 by a nut or the like such that upon application of fluid to the right-hand side of the piston as viewed in FIGURE 4, the crosshead 170 is actuated to, in turn, move the contact bars 162 to the left against the contact points 144 to close the electrical circuits.

The outer end of each contact bar 162 is threaded as indicated by the numeral 229 in FIGURE 7. A fixed washer 230 and a movable washer 232 are sleeved on the outer periphery of the contact bar 162. The washer 230 is welded to the contact bar 162. The vertical flange 208 is provided with four openings, one corresponding to each of the contact bars 162. The threaded ends 229 of the contact bars 162 extend through the openings and are each secured to the flange 208 by means of a pair of threaded lock nuts 234. A washer 236 is located around each contact bar 162 and is secured to the first lock nut 234, as an example, by welding. The washers 236 are in surface-to-surface contact with the inner transite strip 209, while washers 32 are held in surface-to-surface contact with the outer transite strip 210 by means of biasing springs 238. One biasing spring 238 is provided around each contact bar 162 inbetween the corresponding fixed washer 230 and the movable washer 232. One pair of adjacent lead wires 167 are connected to instruments 240, while the other pair of adjacent lead wires are connected to instrument 242.

The cylinder or fluid motor 224 is operated pneumatically, the operation of which is controlled by a solenoid as will be subsequently explained. The instruments 240 and 242, which are located outside of the furnace 10, are commercially available and are so calibrated to convert the E.M.F. generated by the thermocouples into a signal required for temperature indication or control.

Generally, with a heat processing unit having a plurality of chambers, a pair of independently operated contact probe assemblies are associated with each chamber. While in the present invention two pairs of contact assemblies have been shown with different zones in one chamber, it should be understood that in some applications only one pair of contact probe assemblies are utilized in each chamber.

Figure 8:
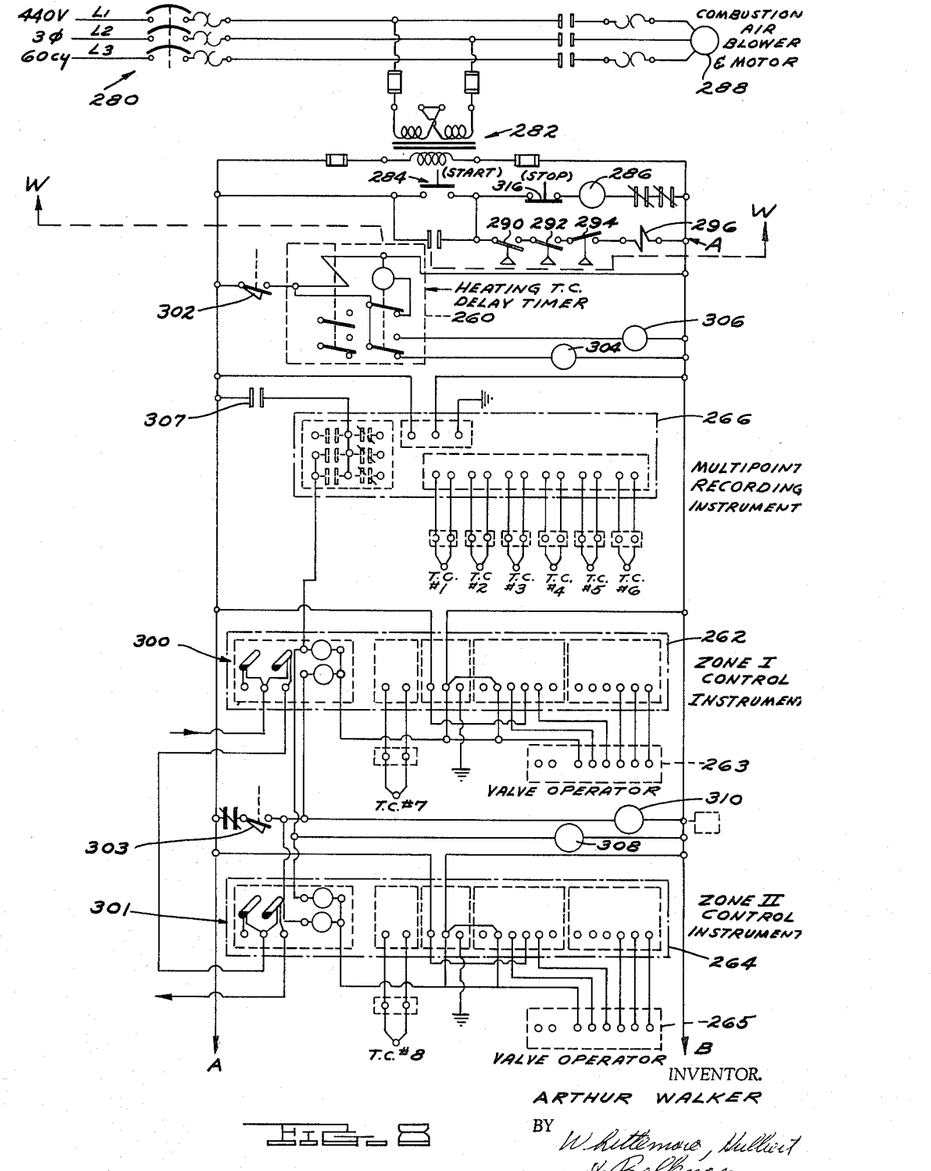

FIGURES 8 and 9 illustrate the safety wiring diagram for the radiant tube fired double end rack type annealing furnace 10. The heating chamber 14 is divided into heating zone I and heating zone II (see FIGURES 4 and 8), while the cooling chamber 16 is divided into cooling zone I and cooling zone II as is indicated in FIGURE 9. Each of the various zones is provided with a pair of contact probes assemblies 154. Certain of the control equipment for the furnace 10, as illustrated in FIGURES 8 and 9, is manufactured by the Minneapolis-Honeywell Regulator Company, of Minneapolis, Minnesota. Certain of the control equipment will be designated in this application by model numbers and such numbers will refer to equipment manufactured by Minneapolis-Honeywell Regulator Company, unless otherwise specified. The letters "T.C.," as will subsequently appear, stand for "thermocouple."

The heating chamber 16 is provided with a heating T.C. delay timer 260, model Eagle, HP57A6 Cycl-Flex Timer, 150 min. range, which is used for a purpose to be subsequently described. Heating zone I and heating zone II are each provided with a dual setpoint proportioning control instrument 262 and 264 respectively, identified as MH. Y153RID–PSH–148–W7–KI–IV–SS–14154–KC–32 Straight Scale Non-Recording Controller, 0–1200° F. range, calibrated for CR.-AL T.C. 110 v.—60 cy. The control instruments 262 and 264 have two indices which may be set, as an example, at 700° F. and 900° F.

Signals from item 266 determine which setting is to be used to control. Actual temperature control is accomplished by TC7 and TC8 which are fixed in the air stream. The instruments 262 and 264 are operatively connected to motors 263 and 265 respectively which in turn control corresponding gas valves which regulate the gas flow or heat input into the radiant tubes 30. The motors 263 and 265 are identified as M.H. 83IEI–A High Torque Industrial Valve Motor 110 v.—60 cy. A multipoint recording instrument 266 is provided to record temperature at each of six control points. In this application, TC1 and TC2 are connected to the stock on the rack in the heating section 14. TC3 and TC4 are fixed thermocouples located in the air stream in zone I and zone II respectively of the heating chamber 14. TC5 and TC6 are fixed thermocouples located in the air stream of zone I and zone II of the cooling chamber 16. Points to which TC1 and TC2 are connected, are also arranged to energize a relay internal to this instrument 266 which, when energized close contacts which in turn supply power to the latching coils relays 300 and 301 in control instruments 262 and 264 respectively. When this relay is in the latched condition, the control is automatically moved from the higher setting of 900° to the lower setting of 700°.

Heating Zones I and II are also provided with conventional over-temperature instruments 268 and 270 respectively which are identified as model ALNOR N–30 Pyrolac-Excess Temperature Cutout, 0–1600° F. range, calibrated for CR–AL. T.C., 110 v.—60 cy.

The cooling chamber 18 has a corresponding cooling T.C. delay timer 272 of the same model and design as timer 260. Cooling zones I and II are each provided with a cooling control instrument 274 and 276 respectively, identified as model MH. 156 C 16–PSH–33–KI–AB Circular Scale Indication Controller, 0–1200° F. range, calibrated for CR.-AL. T.C., 110 v.—60 cy.

FIGURE 8 illustrates a dotted line W—W extending across the top of the figure. The component parts illustrated above the dotted line W—W illustrate standard or conventional safety means for supplying a combustible mixture of air and gas to the controlling gas valves, not shown, for the radiant tubes 30 in the furnace. The safety means includes a conventional power source 280 of 440 volts which is stepped down by a transformer 282 to 110 volts. A start push button is represented by the numeral 284. Upon closing of the start button 284, which may be located in the safety control panel, not shown, a starter 286 is energized which in turn energizes the motor of the combustion air blower 288 located in the furnace 10. Upon the operation of the combustion air blower 288, the switch 290 in the air pipe, not shown (which leads to the tubes 30), is closed. The pressure of the gas in the gas pipes, not shown (which lead to the tubes 30), closes the switches 292 and 294 and as a result of the closing of the switches 290 and 292, a safety shut-off valve 296 is electrically energized so as to direct power to point A in the circuit as illustrated in FIGURE 8. The safety shut-off valve 296 is adapted to be manually operable to be opened or closed as required as is well known in the art.

Assume that there is no load in the heating chamber 14 which is divided into the aforesaid heating zones I and II, each zone having a dual setpoint control instrument, as previously mentioned, which is set, for example, at the highest point of 900° F. TC7 for control instrument 262 is located in the air stream in zone I of the furnace 10, while TC8 for control instrument 264 is located in the air stream in zone II of the furnace. In such a situation the temperature of the gas in the heating chamber 14 of the furnace 10 is maintained at 900° F. by the fixed thermocouples, TC7 and 8. If the temperature should increase above this value, the positions of the aforesaid gas control valve, not shown, for the tubes 30 will be changed to decrease the amount of gas entering the tubes 30 and in turn lower the temperature to 900° F.

When the operator has a loaded carrier 120 in position on the loading station 100, he pushes the cycle start button. If the heating chamber 14 is empty, the charge door 72 will open, carrier 120 will automatically move to a position in chamber 14 and the door 72 will close. The door 72 will not open again until the chamber 14 is empty and the cycle start button has been pushed.

The latching relays 300 and 301 provided in the dual setpoint instruments 262 and 264 respectively are in an unlatched position or condition by a previous operation and, as mentioned previously, the dual setpoint instruments are at the highest of the two settings, and in the present example at 900° F. The relays 300 and 301 are connected in parallel. When the carrier 120 is positioned in the heating chamber 14, a limit switch 302, operated by the carrier 120, is closed so as to lower the door 72. Simultaneously the closing of the limit switch 302 energizes a solenoid valve which results in the moving of the contact probes or bars 162 inwardly into contact with the thermocouple contacts 144 provided on the carrier 120. The closing of the limit switch 302 also starts the preset timer 260 timing to prevent any reading and/or recording by the recording instrument 266 until the time on the timer 260 has expired or timed out. The timer 260 prevents or bypasses any false readings between the contacts 144 and probes 162 until the temperature of the contacts 144 and probes 162 is equal. A pilot light 304 is provided which is lit while the timer 260 is timing.

After the time on the timer 260 has expired, various switches in the timer 260 are actuated so as to direct power to the control relay 306 and energize same. As a result, switch 307 is closed and power is directed to each of the six pairs of control contacts in the multipoint recording instrument 266, one pair of contacts for each of the corresponding thermocouples in the heating chamber 14.

When the temperature of the stock or load C, as indicated on the multipoint recording instrument 266 through the thermocouple pickups 154 and either one of the thermocouples 124 and 126 located in the stock C, reaches the desired value, as an example 700° F., the corresponding contact, either TC1 or TC2 in instrument 266 closes which in turn will latch the relays 300 and 301 in the control instruments 262 and 264 to change the control point to the lower of two settings, and in the present example to 700° F. Simultaneously, power is directed through the circuit to the relay 308 which energizes a soaking timer, not illustrated, which is located in the operational circuit, not shown. As the time on the soaking timer starts to time out, the temperature in zones I and II is maintained as substantially 700° F. After the time on the soaking timer has expired, the discharge door 80 of the heating furnace 10 is moved upwardly and the carrier 120 is automatically moved forwardly therethrough into the cooling zone 16 after which time the discharge door 80 closes.

When the discharge door 80 starts up, the solenoid valve is de-energized so as to move the contact probes 162 away from the carrier 120 to an inoperative position. As the carrier 120 leaves the heating chamber 14, the limit switch 302 opens to reset the time 260 and deenergizes the relay 306. When the discharge door 80 reaches its up position, limit switch contact 303 is closed so as to unlatch the relays 300 and 301 in the control instruments 262 and 264 respectively to return the control point to the higher setting of 900° F., for the start of the subsequent cycle.

As an additional safety feature, over temperature instruments 268 and 270 are provided for heating zones I and II of the heating chamber 14. Following further along with the previous example, both over temperature instruments 268 and 270 are set at 950° F. When the temperature in either zone exceeds, as an example, 950° F., a horn or bell 314 will ring. Such a signal is conventional in the art, and the purpose thereof is to warn the operator that something has happened in the heating chamber 14 which requires immediate attention. In the event the operator cannot locate the trouble immediately, he can manually close the safety shut-off valve 296, thereby preventing gas from entering the tubes 30. In addition, the operator can actuate the stop push button switch 316 (FIGURE 8) so as to shut off the air blower 288, thereby opening the switches 290 and 292. This, in turn, would deenergize the safety shut-off valve 296.

After the heated coils C have been moved into the cooling zone 16, the limit switch 318 is closed by the carrier 120. A cooling delay timer 272 is provided to bypass false readings between the contacts provided on the carrier 120 and the corresponding contact probes when the carrier 120 is first moved into position in the cooling chamber 16. A pilot light 320 is lit during the timing period of the timer 272. After the timer 272 has timed out, power is directed to contacts in the cooling control instrument 274 in zone I. Both cooling instruments 274 and 276 are connected in series and have a setpoint of 300° F. TC11 and TC12 are embedded in the stock and the other ends are connected to the contact block provided on the carrier 120. Thermocouple readings are picked up by means of the TC pickups, as described for the heating chamber, which are connected to controlling instruments by lead wires. When TC11 has reached 300° F., a switch in instrument 274 opens and power is directed to a switch in the other controlling instrument 276. When the temperature in the cooling zone II has also reached 300° F. as indicated by TC12, a switch in instrument 276 is closed and power is directed to the relay 322 which is energized and is effective to energize suitable equipment in the operational circuit, not shown, which opens the discharge door 90 of the cooling chamber 16 and automatically moves the carrier 120 out of the cooling chamber 16 into the auxiliary cooling chamber 18. When the discharge door 90 reaches its up position, limit switch 318 is opened and the timer 272 is reset for the subsequent cycle.

To move the carrier 120 from the air cooling station 18 to the unloading station 116, the operator must push various buttons to (a) start door 92 to open, (b) start carrier 120 moving forward and (c) to start door 92 to close. The rolls in the air cooling chamber 18 and in the unloading station 116 are reversible, thereby making it possible for the operator to move the carrier 120 back from the unloading station 116 to the air cooling chamber 18.

It should be understood that a carrier 120 will not be moved to the next chamber or station, unless the chamber is empty. The system is provided with the following interlocks to prevent improper and/or dangerous operations.

(1) The door 80 between the heating chamber 14 and cooling chamber 16 will not open, unless the purge timer has timed out. This timer starts timing each time the discharge door 90 to the cooling chamber 16 closes.

(2) The carrier in any chamber or section will not move forward if the next section is not empty.

(3) The carrier will not move forward, unless the door between adjacent sections is open.

(4) Limit switches prevent doors and carrier from moving beyond normal limits of travel.

An angle support 330 is carried by the inner surface of the furnace wall 20 and 22 for supporting the contact probe assemblies 154 as best illustrated in FIGURES 3 and 4. The stationary guide 174 is appropriately braced as indicated by the numeral 332 in FIGURE 4 to the casing of the furnace 10, after the stationary guide 174 has been located and aligned in the field.

Figure 5:
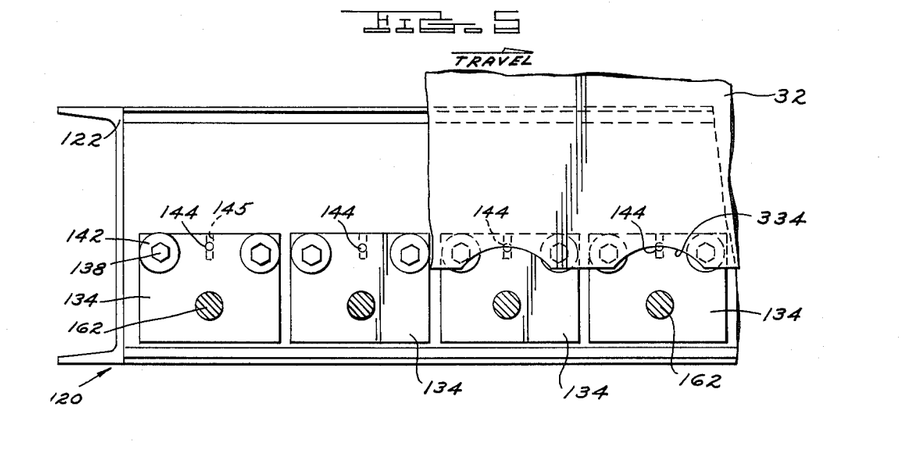
FIGURE 5 is a view taken on line 5—5 of FIGURE 3.

It should be noted that in FIGURE 5 the lower edge of the radiation baffle 32 is appropriately notched as indicated by the numeral 334. The insulation material is removed and the bottom edge of the baffle 32 formed so as not to interfere with the movement of the contact rods 162.

All the various transite parts utilized in the present invention are painted with silicone resin before assembly.

The present invention is particularly adapted for heat processing units of the indirect type and in particular for units designed to provide continuous atmosphere annealing. The unit illustrated in the present invention is particularly adapted for annealing aluminum coils in a continuous process. The unit is atmosphere-tight, using a welded-plate shell construction with, as an example, 8 inch thick insulation and interior panels of stainless steel. The unit operates with a fixed thermocouple with automatic switch-over to the thermocouples buried in the aluminum load. The controls of the present invention are designed to provide greater accuracy in temperature control than has been previously obtained.

The drawings and the foregoing specification constitute a description of the improved thermocouple pickup in such full, clear, concise and exact terms as to enable any person skilled in the art to practice the invention, the scope of which is indicated by the appended claims.

What I claim as my invention is:

1. A heat processing unit comprising an elongated chamber having an entrance at one end thereof, a carrier in said chamber mounted for lengthwise movement through said entrance into said elongated chamber, a door for said entrance adapted to be closed behind said carrier to thereby substantially seal said chamber to maintain a controlled atmosphere therein, said carrier having material to be treated thereon, thermally responsive sensing means on said carrier, including a thermocouple in contact with the material, a pair of electrical contact points on said carrier, and lead wires connecting said thermocouple to said contact points, and means exteriorly of said chamber adapted to be operated by said sensing means, including an instrument for measuring the output of said thermocouple, a pair of contact probes mounted in a wall of said chamber to be in axial alignment with said pair of contact points on said carrier, lead wires connecting said contact probes to said instrument, and means for axially moving said contact probes into direct contact with the aforesaid contact points on said carrier to complete an electrical circuit between said thermocouple and said instrument.

2. A heat processing unit as defined in claim 1 wherein said instrument includes means for calibrating the output of said thermocouple in terms of the temperature of the material in said unit, and wherein said carrier has a second pair of electrical contact points longitudinally spaced on said carrier with respect to said first set of contact points, and said chamber has a second pair of contact probes in axial alignment with said second pair of contact points.

3. A heat processing unit as defined in claim 2 wherein said carrier is adapted to be moved lengthwise with respect to said chamber, and thereby bring both pairs of carrier contact points into alignment with both pairs of contact probes.

4. An industrial furnace of the indirect type utilizing a controlled inert protective gas atmosphere comprising an elongated chamber having a top wall, a bottom wall and a pair of side walls, said chamber forming a gas-tight enclosure between an entrance end and an exit end thereof, transversely movable doors at the ends, a carrier in said chamber mounted for lengthwise movement through one of said doors into said elongated chamber, said carrier having material to be treated thereon, thermally responsive sensing means on said carrier, including a thermocouple in direct contact with the material, a pair of electrical contact points on said carrier, and lead wires connecting said thermocouple to said contact points, and means exteriorly of said chamber adapted to be operated by said sensing means, including an instrument for measuring the output of the thermocouple, a pair of contact probes mounted in a wall of said chamber to be in axial alignment with said pair of contact points on said carrier, lead wires connecting said contact probes to said instrument, said contact probes each having an elongated tubular casing projecting through a wall of said chamber, insulating guides at opposite ends of said tubular casing, a central contact bar axially movable through said insulating guides in said tubular casing, and means for axially moving said contact probes into direct contact with the aforesaid contact points on said carrier to complete an electrical circuit between said thermocouple and said instrument.

5. An industrial furnace defined in claim 4 wherein said last-mentioned means includes an arm operatively connected to the ends of the contact probes located exteriorly of said furnace, said arm being adapted to move said contact probes in unison toward and away from said contact points to respectively make and break the aforesaid electrical circuit.

6. An industrial furnace defined in claim 5 wherein fluid operated means is operatively connected to said arm for moving said arm and said contact probes.

7. A heat-treating apparatus of the indirect type for non-ferrous metals comprising an elongated horizontal passageway having a top wall, a bottom wall and a pair of side walls, said passageway having a heating zone and a cooling zone and forming a gas-tight enclosure between an entrance end and an exit end thereof, transversely movable doors at the ends of said passageway, a conveyor for moving the work successively through said heating and cooling zones, means connected to one of said zones for delivering an inert non-oxidizing, non-carburizing protective gas thereto, an intermediate door in said passageway between said heating and cooling zones, a pair of elongated radiation baffles made from metal at opposite sides of said passageway spaced from and parallel to said side walls to define a pair of heating chambers with said walls, said baffles extending the entire length of the passageway in said heating zone and forming therebetween a work-heating tunnel, the top and bottom edges of said baffles being spaced from and closely adjacent to said top wall and said bottom wall respectively to provide entrance openings and exit openings respectively for said heating chambers, a transversely extending partition near the upper edges of said baffles and spaced from said top wall to define a fan chamber therebetween, said partition extending the entire length of the passageway in said heating zone, a plurality of fans in said fan chamber supported by said top wall with entrance openings therefor in said partition, the ends of said fan chamber being connected to the entrance openings of said heating chambers, said exit openings of said heating chambers being connected to said tunnel adjacent said bottom wall, a plurality of longitudinally spaced vertically extending elongated radiant heater tubes within each of said heating chambers, the upper ends of said tubes being carried by said top wall, said baffles being effective to radiate the heat from said tubes into said work heating tunnel, said fans being effective to forcibly circulate the gas in said heating zone through said fan chamber and said heating chambers to pick up heat from said radiant tubes and then through the exit openings of said heating chambers to said tunnel in a plurality of paths intersecting the path of movement of the work in said tunnel, a thermocouple in contact with the work on said conveyor, a pair of electrical contact points on said conveyor connected to said thermocouple, a measuring instrument for said thermocouple located exteriorly of the walls of said passageway, a pair of contact probes mounted in a side wall of said passageway to be in alignment with said pair of contact points on said conveyor, lead wires connecting said contact probes to said instrument, said contact probes each having an elongated tubular casing projecting through a side wall of said passageway, insulating guides at opposite ends of said tubular casing, a central contact bar axially movable through said insulating guides in said tubular casing, and means for axially moving said contact probes into contact with the contacting points on said conveyor.

References Cited by the Examiner

UNITED STATES PATENTS

| | | | |
|---|---|---|---|
| 846,998 | 3/1907 | Hammond | 73—359 X |
| 1,227,027 | 5/1917 | Bailey et al. | 263—6 |
| 1,339,952 | 5/1920 | Glaeser | 73—351 |
| 1,775,682 | 9/1930 | Martin. | |
| 2,025,534 | 12/1935 | Sheard et al. | 136—4.4 X |
| 2,109,396 | 2/1938 | McCoy | 73—341 |
| 2,466,137 | 4/1949 | Vollrath | 136—4 |
| 2,620,174 | 12/1952 | Passafaro | 263—6 |
| 2,682,649 | 6/1954 | Blonder | 339—108 |
| 2,687,517 | 8/1954 | Despard | 339—263 |
| 2,693,586 | 11/1954 | Dorfman et al. | 339—263 |
| 2,696,116 | 12/1954 | Tarr | 73—351 |
| 2,907,209 | 10/1959 | Wack | 73—341 |
| 2,973,397 | 2/1961 | Halstead | 136—4.4 |
| 3,022,483 | 2/1962 | Yonger | 339—108 |
| 3,031,888 | 5/1962 | Wilhelm | 73—351 |

WILLIAM F. O'DEA, *Primary Examiner.*

JOHN J. CAMBY, CHARLES SUKALO, *Examiners.*

D. G. BLACKHURST, D. A. TAMBURRO,
*Assistant Examiners.*